Oct. 9, 1923. 1,469,881
J. A. BOWDEN
SPRING MEANS FOR DUST CAPS
Original Filed Oct. 8, 1920
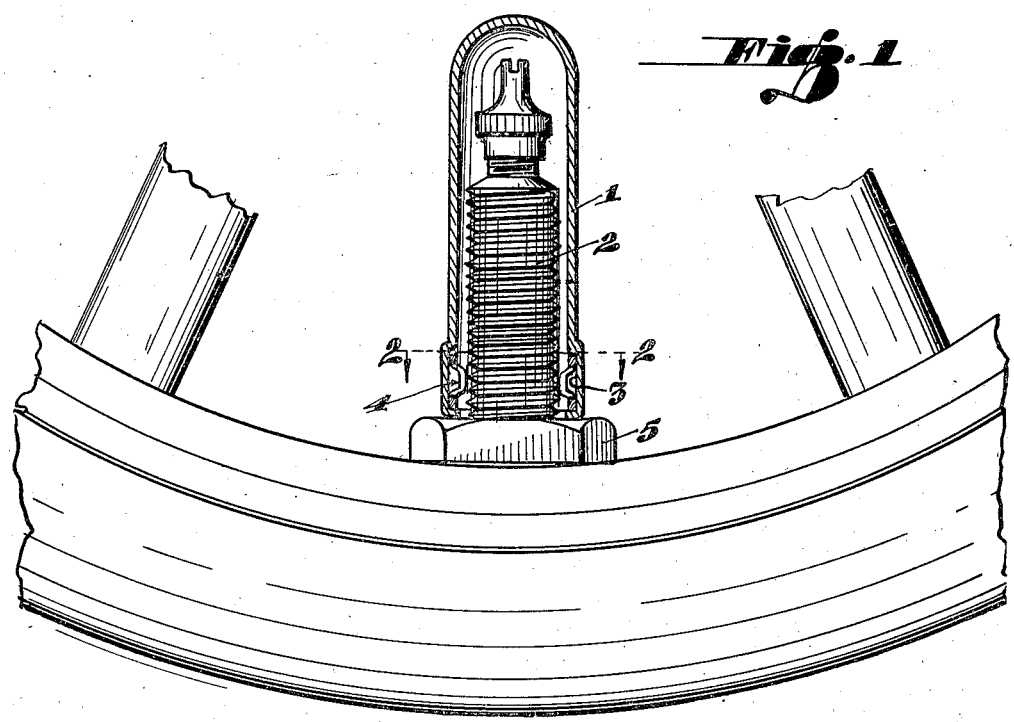
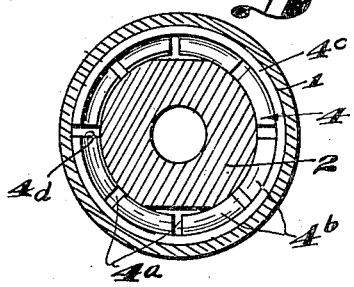
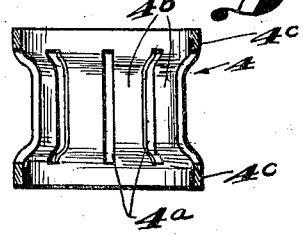
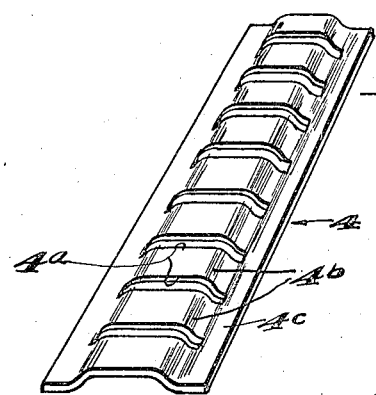
INVENTOR
Junius A. Bowden Patented Oct. 9, 1923.

1,469,881

UNITED STATES PATENT OFFICE.

JUNIUS A. BOWDEN, OF LOS ANGELES, CALIFORNIA, ASSIGNOR TO A. SCHRADER'S SON, INCORPORATED, OF BROOKLYN, NEW YORK, A CORPORATION OF NEW YORK.

SPRING MEANS FOR DUST CAPS.

Application filed October 8, 1920, Serial No. 415,656. Renewed March 6, 1923.

*To all whom it may concern:*

Be it known that I, JUNIUS A. BOWDEN, a citizen of the United States, residing at Los Angeles, in the county of Los Angeles, State of California, have invented new and useful Improvements in Spring Means for Dust Caps, of which the following is a specification.

This invention relates to quick detachable dust caps for tire valve stems.

The main object is to provide spring actuating means adapted to be installed in a dust cap forming a unit of the parts, adaptable for slidably engaging the threads of a tire valve stem and hold it thereto in spring tight engagement.

Other objects and advantages of my improved spring will be more fully explained in the foregoing specification and appended claims.

Fig. 1 shows a front elevation in section, of my dust cap and the spring mounted upon threads of a tire valve stem in connection with a tire. Fig. 2 shows a cross section of the cap and spring means at 2—2 of Fig. 1. Fig. 3 is a longitudinal section of the spring. Fig. 4 shows the spring before shaping it round.

Referring to the details: Fig. 1 shows a cap 1, mounted upon a tire valve stem 2, and seated on a nut 5. This cap has a recess 3, and my improved spring 4, installed therein. Fig. 3, shows the spring 4. This spring means is essentially a band having its upper and lower ends 4$^c$ offset or flanged outwardly. The offset forms an inner projecting central portion, said portion is divided into numerous ribs 4$^b$, adapted to have spring action. The ribs project inwardly as shown in cross section of Fig. 2, and form a circle, the diameter of which is somewhat less than the diameter of the stem 2, in order to provide for spring action. The ribs are integral with the band and are supported thereby.

In the operation of mounting the cap upon the stem, with the spring installed in the recess, the cap may simply be pressed forward against the ribs, in which operation the ribs slidably engage the threads of the stem and owing to the spring action of the ribs, they yield sufficiently to cause a firm tension against the threads of the stem and thus hold the cap detachably connected to the stem. When the cap is withdrawn, the ribs react to their normal position.

I do not limit myself to the recess in the cap, as means for securing the spring therein as other means may be employed. My invention is intended to broadly cover spring actuating means, formed in band like shape and offset at its upper end and offset at its lower end, causing an inwardly central projecting portion, said portion divided into ribs having spring action, therefore any modification that includes these elements comes within the scope of my invention.

Having described my invention, what I claim is:

1. In a quick detachable dust cap for a tire valve stem, spring means in the form of a band, said band formed with outwardly projecting flanges and numerous ribs formed centrally of said flanges, said spring adapted to be inserted in a dust cap, and the ribs adapted to engage a tire valve stem.

2. In a quick detachable dust cap for a tire valve stem, spring means in the form of a band, said band formed with outwardly projecting flanges and numerous longitudinal ribs formed between said flanges, adjacent ribs being separated by an opening, said spring adapted to be inserted in a dust cap, and the ribs adapted to engage a tire valve stem.

3. As a new article of manufacture, a spring adapted for holding a dust cap detachably connected to a tire valve stem having threads on its exterior, said spring being in the form of a band having projecting ribs formed on its inner face, said ribs formed intermediate the upper and lower ends of the band whereby to provide a margin at said ends, said spring adapted to be secured in a dust cap, said ribs adapted to slidably engage said threads.

4. In a dust cap for a valve stem, a spring band formed with an offset portion at its outer and inner ends and having a series of longitudinal ribs intermediate said ends, means for securing said band in the cap, said ribs adapted to engage a valve stem.

5. In a dust cap for a valve stem, spring means of band like form having a series of longitudinal bearing surfaces, said surfaces being separated by openings and said band being flanged at its outer and inner ends, means for securing the band in a cap, said ribs adapted to engage a valve stem.

In testimony whereof, I have hereunto set my hand, at Los Angeles, California, this 30th day of September, 1920.

JUNIUS A. BOWDEN.